United States Patent
Liu et al.

(10) Patent No.: US 10,148,080 B2
(45) Date of Patent: Dec. 4, 2018

(54) SINGLE-PHASE-TO-EARTH FAULT PROCESSING DEVICE AND METHOD FOR NEUTRAL NON-EFFECTIVELY GROUNDED DISTRIBUTION NETWORK

(71) Applicants: STATE GRID CORPORATION OF CHINA, Beijing (CN); STATE GRID SHAANXI ELECTRIC POWER RESEARCH INSTITUTE, Xi'an, Shaanxi (CN)

(72) Inventors: Jian Liu, Shaanxi (CN); Pinde Li, Shaanxi (CN); Xiaoqing Zhang, Shaanxi (CN); Zhihua Zhang, Shaanxi (CN); Shuren Zhao, Shaanxi (CN)

(73) Assignees: STATE GRID CORPORATION OF CHINA, Beijing (CN); STATE GRID SHAANXI ELECTRIC POWER RESEARCH INSTITUTE, Xi'an, Shaanxi (CN)

( * ) Notice: Subject to any disclaimer, the term of this patent is extended or adjusted under 35 U.S.C. 154(b) by 351 days.

(21) Appl. No.: 15/022,183

(22) PCT Filed: Sep. 10, 2014

(86) PCT No.: PCT/CN2014/086232
§ 371 (c)(1),
(2) Date: Mar. 15, 2016

(87) PCT Pub. No.: WO2015/035913
PCT Pub. Date: Mar. 19, 2015

(65) Prior Publication Data
US 2016/0233661 A1     Aug. 11, 2016

(30) Foreign Application Priority Data

Sep. 16, 2013   (CN) .......................... 2013 1 0421417

(51) Int. Cl.
*H02H 3/16*    (2006.01)
*H02H 7/26*    (2006.01)
(Continued)

(52) U.S. Cl.
CPC .............. *H02H 3/167* (2013.01); *H01H 9/54* (2013.01); *H01H 33/66* (2013.01); *H01H 89/00* (2013.01); *H02H 7/26* (2013.01)

(58) Field of Classification Search
CPC .................................. H02H 3/16; H02H 3/33
(Continued)

(56) References Cited

U.S. PATENT DOCUMENTS

2003/0043515 A1 *   3/2003   Brungs ................... H02H 3/00
                                                          361/42

\* cited by examiner

*Primary Examiner* — Dharti Patel

(57) ABSTRACT

A single-phase-to-earth fault processing device for a neutral non-effectively grounded distribution network includes a split-phase arc quenching device connected between earth and a three-phase bus of the distribution network, and a controller with an input end connected with a single-phase-to-earth phase selection device of the distribution network. The split-phase arc quenching device includes a multiphase switching device which operates independently for each phase, and a fuse connected in series with the multiphase switching device. The controller is for controlling opening and closing of three single-phase switches in the multiphase switching device. A single-phase-to-earth fault processing method firstly controls the split-phase arc quenching device to preprocess the fault. If the fault still exists, through a ground resistor a zero-sequence current is generated on a fault line. After delaying to wait for a line to isolate a fault section, a ground connection of the neutral is cut to restore the distribution network.

3 Claims, 1 Drawing Sheet

(51) Int. Cl.
*H01H 9/54* (2006.01)
*H01H 33/66* (2006.01)
*H01H 89/00* (2006.01)

(58) Field of Classification Search
USPC .................................................. 361/42, 49
See application file for complete search history.

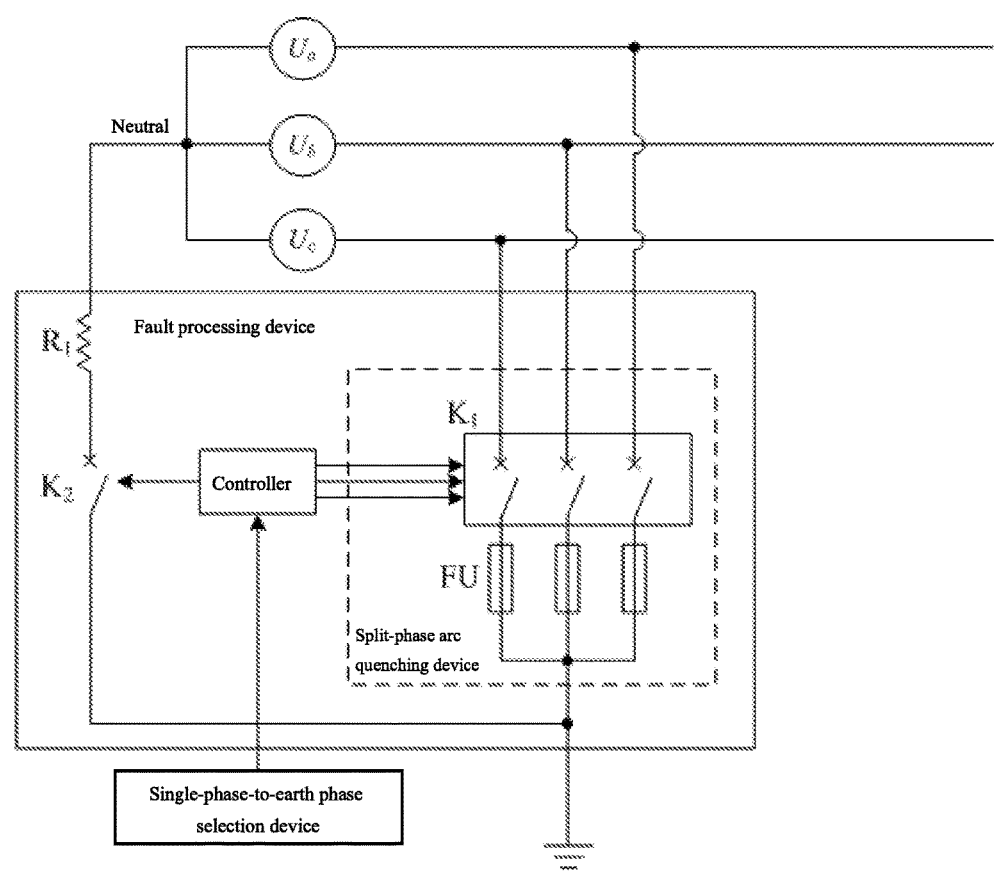

SINGLE-PHASE-TO-EARTH FAULT PROCESSING DEVICE AND METHOD FOR NEUTRAL NON-EFFECTIVELY GROUNDED DISTRIBUTION NETWORK

CROSS REFERENCE OF RELATED APPLICATION

This is a U.S. National Stage under 35 U.S.C 371 of the International Application PCT/CN2014/086232, filed Sep. 10, 2014, which claims priority under 35 U.S.C. 119(a-d) to CN 201310421417.0, filed Sep. 16, 2013.

BACKGROUND OF THE PRESENT INVENTION

Field of Invention

The present invention relates to a field of processing distribution network single-phase-to-earth faults, and more particularly to single-phase-to-earth fault processing device and method for a neutral non-effectively grounded distribution network.

Description of Related Arts

Nowadays the distribution networks in most areas of China adopt the neutral ungrounded operation manner. When the system has a relatively large capacitive current and fails to quench the ground arc, it is necessary to arrange the arc suppression coil. The arc suppression coil is able to obviously increase the power supply reliability of the distribution network, and relatively effectively suppress the intermittent arc ground overvoltage. However, the arc suppression coil is found to have the following problems in usage.

(1) Because of the diversified operation manners of the distribution network and the randomness of the arc ground point, it is difficult for the arc suppression coil to effectively compensate the capacitive current. Moreover, the arc suppression coil merely compensates the power-frequency capacitive current, while in fact, the currents passing the ground point include not only the power-frequency capacitive current, but also a large number of the high-frequency currents and the resistive currents. In worse cases, merely the high-frequency currents and the resistive currents are already enough to sustain the continuous combustion of the arc. Thus, the arc suppression coil fails to completely quench the arc.

(2) When the non-ground fault of the distribution network occurs, such as the break line, the open-phase fault, and the capacitive coupling of the lines on the same tower, the asymmetrical voltage of the distribution network increases, which may cause the automatic adjustment controller of the arc suppression coil to act upon a mistaken judgment that the distribution network is grounded. Herein, a quite high neutral displacement voltage is generated in the distribution network, leading to a great increase in the single-phase voltage or the two-phase voltage in the system and the damages brought to other devices in the distribution network.

(3) The arc suppression coil is set according to specific parameter changes of the distribution network. Thus, with the expansion of the distribution network, the parameter requirements on the arc suppression coil also change, and thus, it is necessary to continuously change the arc suppression coil, which is disadvantageous for the long-range plan and the maintenance management of the distribution network.

Moreover, the fault line selection and the fault section location for the single-phase-to-earth fault of the neutral non-effectively grounded distribution network are always the difficulties in the field of distribution network operation control. Even though no arc suppression coil is arranged, the characteristics of the steady-state zero-sequence current are unobvious. The arc suppression coil compensates the capacitive current of the system by the inductive current of the arc suppression coil, leading to the further decrease of the small capacitive current on the fault line and the more difficult fault line selection and location.

SUMMARY OF THE PRESENT INVENTION

An object of the present invention is to solve the above problems in the prior arts, and provide single-phase-to-earth fault processing device and method for a neutral non-effectively grounded distribution network, which are able to effectively suppress a ground arc caused by various currents and applicable in rapid fault line selection and location.

Technical solutions of the present invention are described as follows.

A single-phase-to-earth fault processing device for a neutral non-effectively grounded distribution network comprises: a split-phase arc quenching device, connected between earth and a three-phase bus of the distribution network; and a controller with an input end connected with a single-phase-to-earth phase selection device of the distribution network; wherein: the split-phase arc quenching device comprises a multiphase switching device which operates independently for each phase, and a fuse which is connected in series with the multiphase switching device; and the controller is for controlling opening and closing of three single-phase switches, corresponding to the three-phase bus, in the multiphase switching device.

Preferably, the multiphase switching device adopts a vacuum breaker or a vacuum contactor, which operates independently for each phase.

Preferably, the single-phase-to-earth fault processing device further comprises a ground resistor connected with a neutral of the distribution network, and a ground resistor switch is arranged on a connection line of the ground resistor.

Further preferably, the ground resistor has a resistance of 5.5-70 Ohms; and the ground resistor switch adopts a single-phase vacuum breaker or a single-phase vacuum contactor.

Preferably, the controller is further for controlling opening and closing of the ground resistor switch.

Further preferably, the ground resistor and the ground resistor switch are connected in series and arranged between the neutral on a low-voltage side of a transformer of the distribution network and the earth; and, when a low-voltage winding of the transformer adopts a triangle connection, an exclusive ground transformer is adopted to form the neutral.

A single-phase-to-earth fault processing method for the neutral non-effectively grounded distribution network, with the above single-phase-to-earth fault processing device for the neutral non-effectively grounded distribution network, comprises steps of:

1) when a single-phase-to-earth fault occurs in the distribution network, receiving, by the controller, a fault warning and a phase selection signal, sent from the single-phase-to-earth phase selection device of the distribution network; sending a closing instruction to the single-phase switch, corresponding to the phase selection signal, in the split-phase arc quenching device, so as to ground a bus of a corresponding phase; and, after delaying for 1-2 s, sending an opening instruction to the single-phase switch which is closed; and 2) after opening the corresponding single-phase switch, if the single-phase-to-earth phase selection device no longer sends the fault warning and the phase selection signal, determining the single-phase-to-earth fault to be transient and cleared, and restoring a normal operation state of the distribution network; and if the single-phase-to-earth phase selection device continues sending the fault warning and the phase selection signal, determining the single-phase-to-earth fault to be permanent; sending the closing instruction to the ground resistor switch by the controller; after closing the ground resistor switch, grounding the neutral of the distribution network through the ground resistor; generating a zero-sequence current over a zero-sequence overcurrent constant value on a fault line; delaying for 5-10 s to wait for a line to automatically finish isolating a fault section; then, sending the opening instruction to the ground resistor switch; after opening the ground resistor switch, finishing isolating the single-phase-to-earth fault of the distribution network, and restoring a normal operation state of the distribution network.

Compared with the prior arts, the present invention has following advantages.

The single-phase-to-earth fault processing device, for the neutral non-effectively grounded distribution network, adopts the conventional single-phase-to-earth phase selection device in the distribution network to provide an input of signal source for the controller, with a simple structure. Through the split-phase arc quenching device connected between the earth and the three-phase bus of the distribution network, the bus corresponding to a fault phase is directly grounded, and a fault point arc of the fault phase is transferred, so as to guarantee a complete suppression of the fault point arc when the single-phase-to-earth fault occurs, to effectively suppress an intermittent arc ground overvoltage, and to provide a safe and reliable operation. Moreover, the single-phase-to-earth fault processing device has a high adaptability to parameter changes of the distribution network, needless of changing the devices when a scale of the distribution network increases or the operation manner of the distribution network changes.

The single-phase-to-earth fault processing method for the neutral non-effectively grounded distribution network firstly controls the split-phase arc quenching device through the controller to preprocess the single-phase-to-earth fault. If the single-phase-to-earth fault is cleared through preprocessing, the single-phase-to-earth fault is transient. If the single-phase-to-earth fault still exists after preprocessing, through the ground resistor connected to the neutral, on the fault line is generated the zero-sequence current which is detectable, with obvious characteristics, and over the zero-sequence overcurrent constant value. After delaying to wait for the line to automatically finish isolating the fault section, a ground connection of the neutral is cut, so as to restore the distribution network. The method solves the problems of the fault line selection and the fault section location for the single-phase-to-earth fault of the neutral non-effectively grounded distribution network, which enables the distribution automation system to identify and isolate the single-phase-to-earth fault.

These and other objectives, features, and advantages of the present invention will become apparent from the following detailed description, the accompanying drawings, and the appended claims.

BRIEF DESCRIPTION OF THE DRAWINGS

The FIGURE is a sketch view of principles and connections of a single-phase-to-earth fault processing device for a neutral non-effectively grounded distribution network according to a preferred embodiment of the present invention.

DETAILED DESCRIPTION OF THE PREFERRED EMBODIMENT

The present invention is further illustrated with a preferred embodiment which is exemplary only and not intended to be limiting.

As showed in the FIGURE, according to the preferred embodiment of the present invention, a single-phase-to-earth fault processing device for a neutral non-effectively grounded distribution network comprises: a split-phase arc quenching device connected between earth and a three-phase bus of the distribution network; and a controller with an input end connected with a single-phase-to-earth phase selection device of the distribution network; wherein: the split-phase arc quenching device comprises a multiphase switching device which operates independently for each phase, and a fuse which is connected in series with the multiphase switching device; and the controller is for controlling opening and closing of three single-phase switches, corresponding to the three-phase bus, in the multiphase switching device. According to the preferred embodiment of the present invention, a transformer is embodied to adopt a star connection and the distribution network is embodied to be a neutral ungrounded distribution network. As showed in the FIGURE, the split-phase arc quenching device comprises the multiphase switching device K1 and the fuse FU, which are connected in series and arranged between the three-phase bus, A, B, and C, and the earth. The multiphase switching device K1 adopts a vacuum breaker or a vacuum contactor, which operates independently for each phase. The fuse FU is for providing an overvoltage protection for the distribution network when the single-phase-to-earth phase selection device has a wrong phase selection or the single-phase-to-earth fault develops into a two-phase-to-earth fault.

Furthermore, the single-phase-to-earth fault processing device further comprises a ground resistor connected with the neutral of the distribution network, wherein a ground resistor switch is arranged on a connection line of the ground resistor. As showed in the FIGURE, according to the preferred embodiment of the present invention, the ground resistor R1 and the ground resistor switch K2 are connected in series and arranged between the neutral on a low-voltage side of the transformer and the earth. When a low-voltage winding of the transformer adopts a triangle connection, the neutral does not exist, and thus, an exclusive ground transformer is adopted to form the neutral. A resistance of the ground resistor R1 is chosen according to a zero-sequence overcurrent setting value, generally between 5.5-70 Ohms. The ground resistor switch K2 is preferred to adopt a single-phase vacuum breaker or a single-phase vacuum contactor whose opening and closing are controlled by the controller.

A single-phase-to-earth fault processing method for the neutral non-effectively grounded distribution network, based on the above single-phase-to-earth fault processing device for the neutral non-effectively grounded distribution network, comprises steps of:

1) when a single-phase-to-earth fault occurs in the distribution network, receiving, by the controller, a fault warning and a phase selection signal, sent from the single-phase-to-earth phase selection device of the distribution network; sending a closing instruction to the single-phase switch, corresponding to the phase selection signal, in the split-phase arc quenching device, so as to ground a bus of a corresponding phase; and, after delaying for 1-2 s, sending an opening instruction to the single-phase switch which is closed; wherein the controller is able to respond 20 ms after receiving the fault warning and the phase selection signal, and send the instruction to the split-phase arc quenching device; and 2) after opening the corresponding single-phase switch, if the single-phase-to-earth phase selection device no longer sends the fault warning and the phase selection signal, determining the single-phase-to-earth fault to be transient and cleared, and restoring a normal operation state of the distribution network; and if the single-phase-to-earth phase selection device continues sending the fault warning and the phase selection signal, determining the single-phase-to-earth fault to be permanent; sending the closing instruction to the ground resistor switch by the controller; after closing the ground resistor switch, grounding the neutral of the distribution network through the ground resistor; generating a zero-sequence current over a zero-sequence overcurrent constant value on a fault line; delaying for 5-10 s to wait for a line to automatically finish isolating a fault section; then, sending the opening instruction to the ground resistor switch; after opening the ground resistor switch, finishing isolating the single-phase-to-earth fault of the distribution network, and restoring a normal operation state of the distribution network.

Specifically speaking, when the transient single-phase-to-earth fault occurs in the phase A of a line of the distribution network, firstly the controller receives a single-phase-to-earth warning and the phase selection signal of the single-phase-to-earth phase selection device, which starts processing the single-phase-to-earth fault. And, according to phase selection information, the single-phase switch corresponding to the phase A, namely an phase A switch, of the multiphase switching device K1 is controlled by the controller to be closed, in such a manner that an arc current at a fault point is transferred and then an arc at the fault point is quenched. After delaying for 1 s, the controller instructs the phase A switch of the multiphase switching device K1 to open. The fault warning and the phase selection signal of the single-phase-to-earth phase selection device on site disappear, and the distribution network restores the normal operation state.

When the permanent single-phase-to-earth fault occurs in the phase A of a line of the distribution network, firstly the controller receives the single-phase-to-earth warning and the phase selection signal of the single-phase-to-earth phase selection device, which starts processing the single-phase-to-earth fault. And, according to the phase selection information, the phase A switch of the multiphase switching device K1 is controlled by the controller to be closed. After delaying for 1 s, the controller instructs the phase A switch of the multiphase switching device K1 to open. Because the single-phase-to-earth fault is permanent, the fault warning and the phase selection signal of the single-phase-to-earth phase selection device on site still exist. The controller sends an instruction to the ground resistor switch to close the ground resistor switch; herein the distribution network is converted into a manner of neutral grounding through the ground resistor, which leads to a generation of the zero-sequence current over the zero-sequence overcurrent setting value on the fault line. Accordingly, a distribution automation system of the distribution network or a zero-sequence overcurrent protection device on the line of the distribution network locates and isolates the fault section. After delaying for 5 s, the controller instructs the ground resistor switch again to open, and the distribution network restores the normal operation state.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A single-phase-to-earth fault processing device for a neutral non-effectively grounded distribution network, comprising: a split-phase arc quenching device connected between earth and a three-phase bus of the distribution network; and a controller with an input end connected with a single-phase-to-earth phase selection device of the distribution network; wherein: said split-phase arc quenching device comprises a multiphase switching device which operates independently for each phase, and a fuse which is connected in series with said multiphase switching device; and said controller is for controlling opening and closing of three single-phase switches, corresponding to the three-phase bus, in said multiphase switching device;

said multiphase switching device is a vacuum breaker or a vacuum contactor, which operates independently for each phase;

the single-phase-to-earth fault processing device further comprises a ground resistor connected with a neutral of the distribution network, and a ground resistor switch arranged on a connection line of said ground resistor; said ground resistor has a resistance of 5.5-70 Ohms; and said ground resistor switch is a single-phase vacuum breaker or a single-phase vacuum contactor; and said controller is further for controlling opening and closing of said ground resistor switch.

2. The single-phase-to-earth fault processing device for the neutral non-effectively grounded distribution network, as recited in claim 1, wherein: said ground resistor and said ground resistor switch are connected in series and arranged between the neutral on a low-voltage side of a transformer of the distribution network and the earth; and, when a low-voltage winding of the transformer is in a triangle connection, an exclusive ground transformer is adopted to form the neutral.

3. A single-phase-to-earth fault processing method for a neutral non-effectively grounded distribution network, with the single-phase-to-earth fault processing device for the neutral non-effectively grounded distribution network as recited in claim 2, comprising steps of:

1) when a single-phase-to-earth fault occurs in the distribution network, receiving, by the controller, a fault warning and a phase selection signal, sent from the single-phase-to-earth phase selection device of the distribution network; sending a closing instruction to the single-phase switch, corresponding to the phase selection signal, in the split-phase arc quenching device, so as to ground a bus of a corresponding phase; and, after delaying for 1-2 s, sending an opening instruction to the single-phase switch which is closed; and 2) after opening the corresponding single-phase switch, if the single-phase-to-earth phase selection device no longer sends the fault warning and the phase selection signal, determining the single-phase-to-earth fault to be transient and cleared, and restoring a normal operation state of the distribution network; and if the single-phase-to-earth phase selection device continues sending the fault warning and the phase selection signal, determining the single-phase-to-earth fault to be permanent; sending the closing instruction to the ground resistor switch by the controller; after closing the ground resistor switch, grounding the neutral of the distribution network through the ground resistor; generating a zero-sequence current over a zero-sequence overcurrent constant value on a fault line; delaying for 5-10 s to wait for a line to automatically finish isolating a fault section; sending the opening instruction to the ground resistor switch; after opening the ground resistor switch, finishing isolating the single-phase-to-earth fault of the distribution network, and restoring a normal operation state of the distribution network.

\* \* \* \* \*